United States Patent [19]
Huang

[11] Patent Number: 5,954,106
[45] Date of Patent: Sep. 21, 1999

[54] WORK BENCH HAVING AN ADJUSTABLE GUIDE

[76] Inventor: Jin Lai Huang, No. 1-1, Lane Chung Hsin, Min Heh Tsuen, Shoei Li Chen, Nan Tou Hsien, Taiwan

[21] Appl. No.: 09/080,744

[22] Filed: May 18, 1998

[51] Int. Cl.$^6$ .............................. B25H 1/00; B27B 31/00
[52] U.S. Cl. ........................ 144/286.5; 83/438; 83/446; 83/477.2; 144/253.5; 144/253.7; 144/286.1
[58] Field of Search .................................. 83/438, 468.7, 83/471.3, 477.2, 574, 444, 446; 269/303, 318; 144/1.1, 253.1, 253.5, 253.7, 286.1, 286.5

[56] References Cited

U.S. PATENT DOCUMENTS 5,518,053  5/1996  Robison .............................. 144/286.1
5,722,308  3/1998  Ceroll et al. .......................... 144/253.5

*Primary Examiner*—W. Donald Bray
*Attorney, Agent, or Firm*—Charles E. Baxley, Esq.

[57] ABSTRACT

A work bench includes a table secured on top of a base and having a pair of parallel grooves. Two pairs of sprockets are rotatably secured to the table and extended inward of the grooves. Two endless chains are engaged with the sprockets and each has a portion slidably engaged in the grooves. A guide is secured to the chains and moveable in concert with the chains. Two couplers are secured between the guide and the chains. One of the couplers includes a downward dependent ear for slidably engaging with the table. A quick release device is secured to the other coupler for engaging with the table and for locking the guide to the table. The guide may be quickly adjusted relative to the table when the quick release device is released.

10 Claims, 12 Drawing Sheets

WORK BENCH HAVING AN ADJUSTABLE GUIDE

BACKGROUND OF THE INVENTION

1. Field of the Invention

The present invention relates to a work bench, and more particularly to a work bench having an adjustable guide for guiding the movement of the work piece.

2. Description of the Prior Art

Typical work benches comprise a table provided on top of a base, and a guide fixed on top of the table for guiding the movement of the work piece. However, the guide is solidly secured to the table and may not be adjusted relative to the table for guiding the work pieces of different sizes.

The present invention has arisen to mitigate and/or obviate the afore-described disadvantages of the conventional work benches.

SUMMARY OF THE INVENTION

The primary objective of the present invention is to provide a work bench having an adjustable guide for guiding the movement of the work piece.

In accordance with one aspect of the invention, there is provided a work bench comprising a base, a table secured on top of the base, the table including a pair of parallel grooves formed therein, two pairs of sprockets rotatably secured to the table and extended inward of the pair of grooves, two endless chains engaged with the sprockets and each including a portion slidably engaged in the pair of grooves, a guide secured to the chains and moveable in concert with the chains, and means for locking the guide to the table.

The table includes a bottom and includes a pair of ribs secured to the bottom of the table and parallel to each other, the sprockets are rotatably secured to the ribs and extended inward of the grooves.

A shaft is secured between a first pair of the sprockets for allowing the chains to be moved in concert with each other.

The guide locking means includes two couplers secured to bottom of the guide and secured to the chains for allowing the guide to be moved in concert with the chains. A first of the couplers includes a downward dependent ear for slidably engaging with the table, and a quick release device secured to a second of the couplers for engaging with the table and for locking the guide to the table. The quick release device includes a cam rotatably secured to the second coupler, the second coupler includes a notch and a panel having a neck portion slidably engaged in the notch, the cam is engaged with the panel for forcing the panel to engage with the table and to lock the guide to the table. The guide includes an oblong hole, the cam includes a handle extended through the oblong hole for allowing the cam to be easily operated. The base includes a bottom plate, a lever having a first end pivotally coupled to the bottom plate at a pin and having a second end and having a middle portion, and a wheel secured to the middle portion of the lever, the wheel is allowed to be moved downward beyond the base when the lever is rotated about the pin. The bottom plate includes a stop for engaging with the lever and for maintaining the lever at a downward position.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
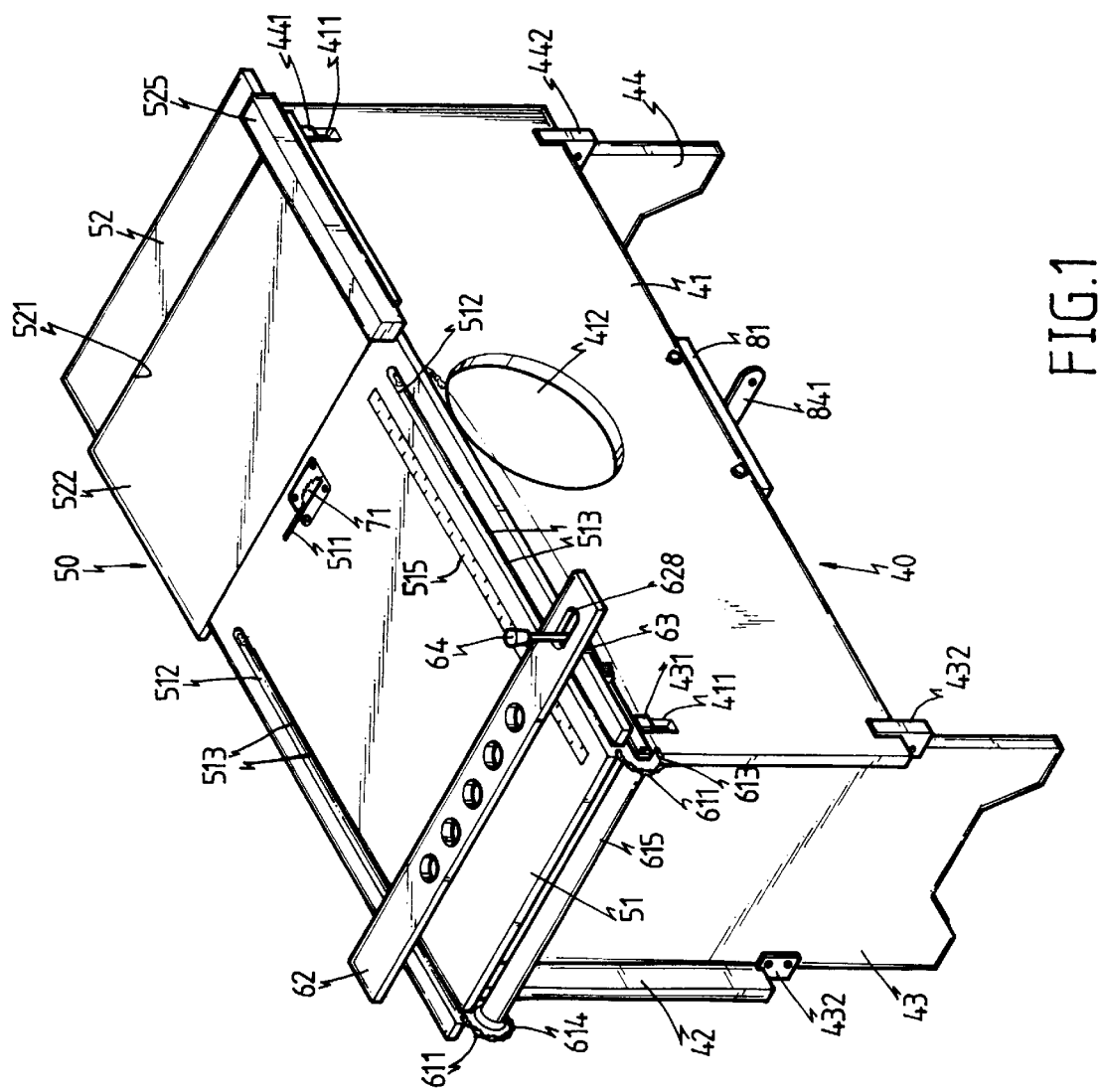
FIG. 1 is a perspective view of a work bench in accordance with the present invention.
Figure 2:
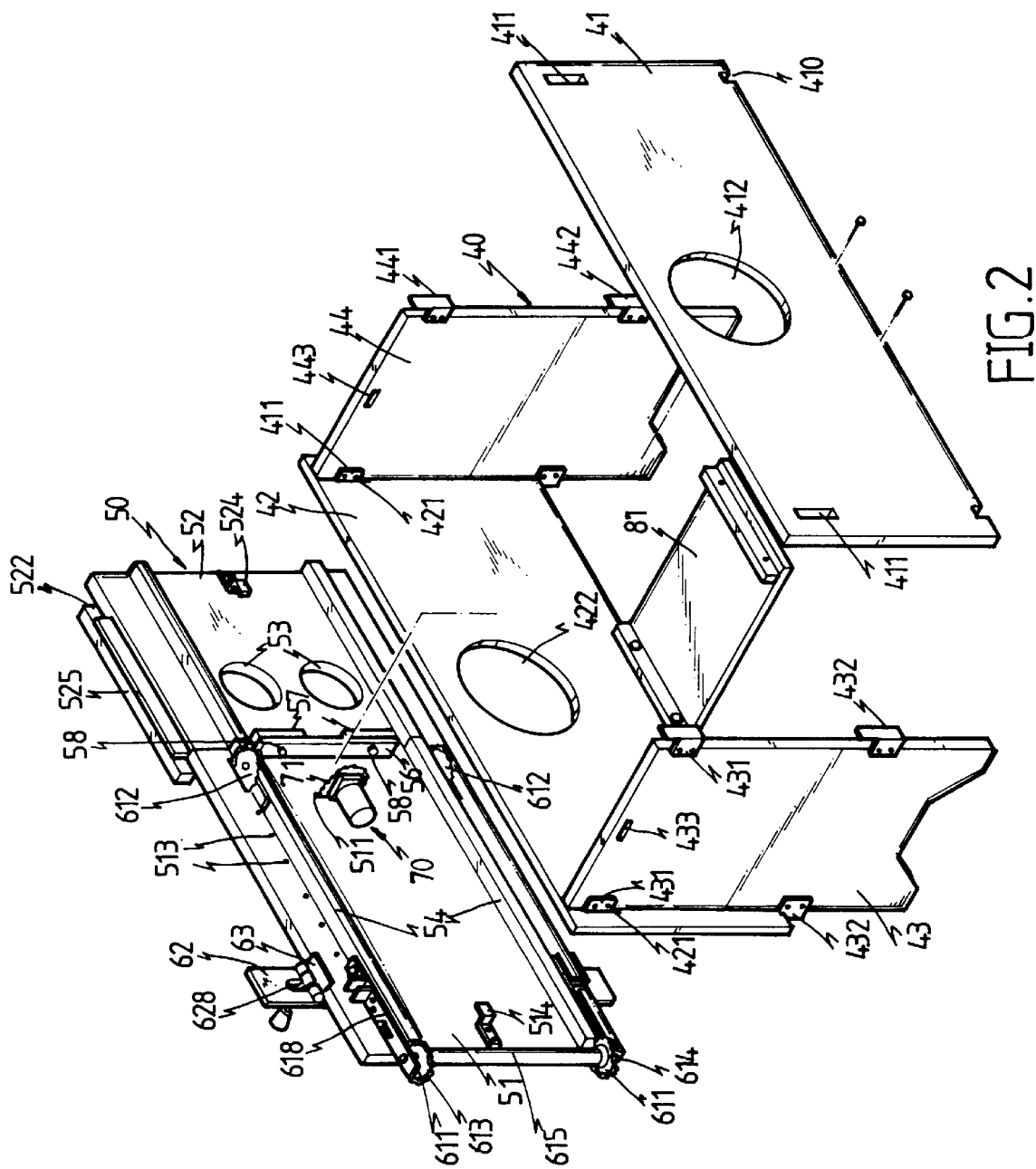
FIG. 2 is an exploded view of the work bench.
Figure 3:
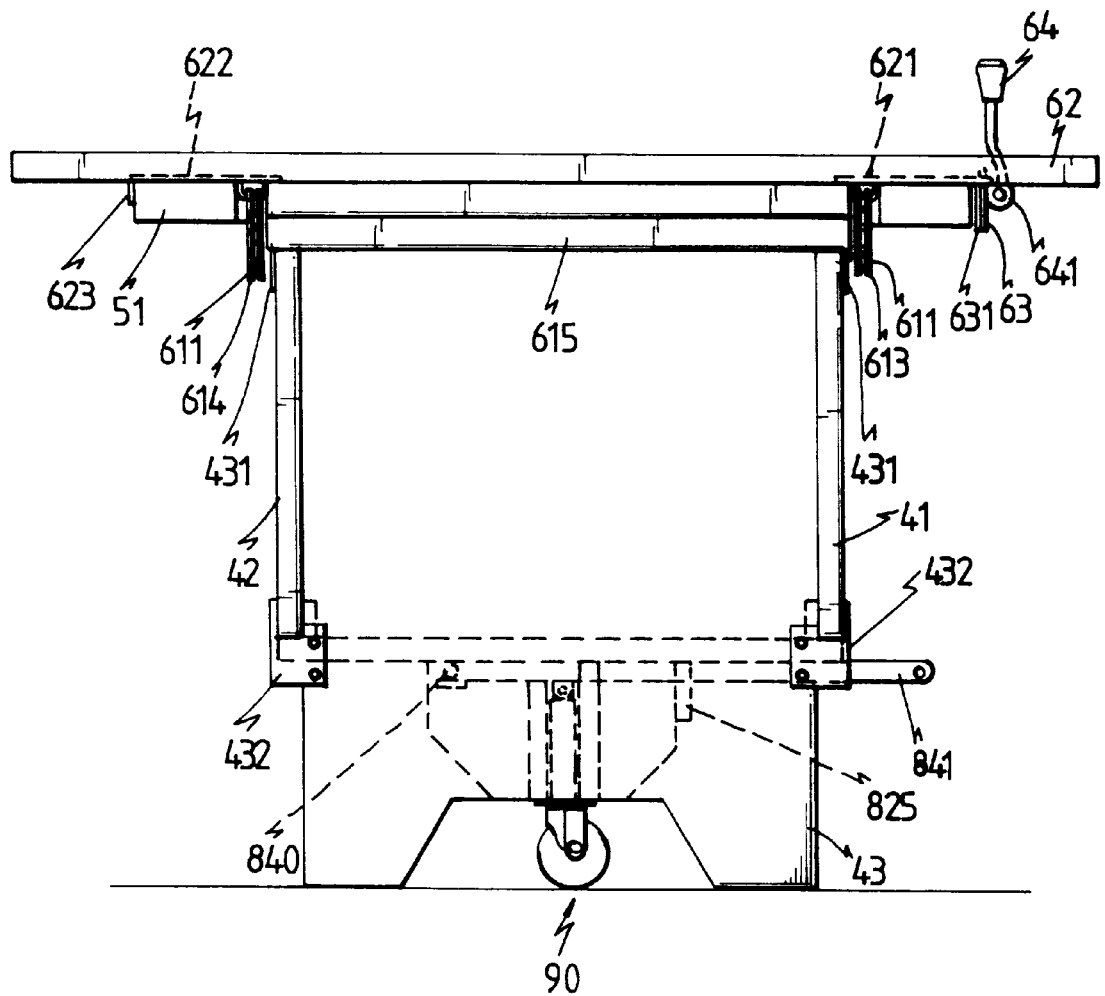
FIG. 3 is a plan view of the work bench.

Referring to the drawings, and initially to FIGS. 1–3, a work bench in accordance with the present invention comprises a base 40 including a front plate 41, a rear plate 42 and two side plates 43, 44. The side plates 43, 44 each includes two pairs of brackets 431, 432, 441, 442 secured to the upper and lower portions and each includes a hole 433, 443 formed in the upper portion. The front plate 41 and the rear plate 42 each includes two notches 410 formed in the bottom for engaging with the pairs of brackets 432, 442 and each includes two holes 411 formed in the upper portion for engaging with the other pairs of brackets 431, 441, and for securing the plates 41–44 together. The front plate 41 and the rear plate 42 each includes a weight reducing opening 412, 422. A table 50 includes two boards 51, 52 secured together by bars 56, 57 and fasteners 58. The board 52 preferably includes one or more weight reducing openings 53. The table 50 includes two brackets 514, 524 for engaging with the holes 433, 443 of the side plates 43, 44 and for securing the table 50 to the base 40. The board 52 includes a channel 521 for slidably receiving a slide 522 which includes an upper surface flush with that of the boards 51, 52 and which includes a beam 525 secured thereto for engaging with the work piece to be moved relative to the table 50. The board 51 includes a slit 511 for receiving a saw blade 71 which is secured to a motor 70 so as to be driven by the motor 70. The board 51 preferably includes a scale 515 provided on top thereof.

Figure 4:
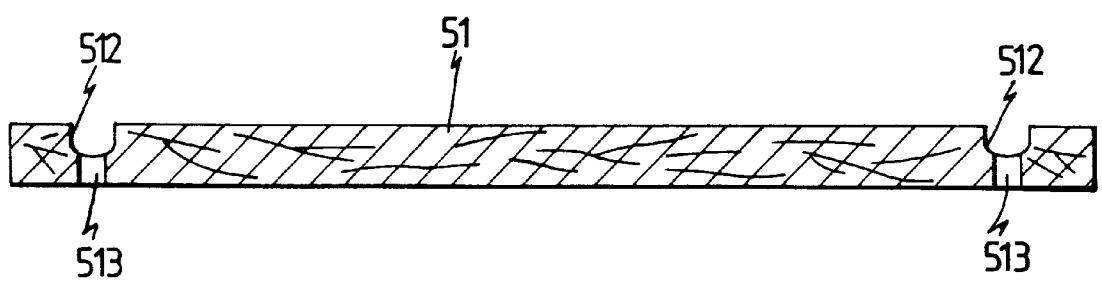
FIG. 4 is a cross sectional view of a table plate.

The board 51 includes a pair of grooves 512 formed therein and parallel to each other and preferably perpendicular to the channel 521 and includes a number of holes 513 (FIGS. 1, 2, 4) communicating with the grooves 512. A pair of ribs 54 are secured to the bottom of the table 50 and parallel to each other. Two pairs of sprockets 611, 612 are rotatably secured to the ribs 54 and slightly extends inward of the grooves 512. Two endless chains 613, 614 are engaged with the sprockets 611, 612 and each has an upper portion slidably engaged in the grooves 512. The sprockets 611 are preferably adjustably secured to the ribs 54 by two adjustable mechanisms 618 which may be used for adjusting the tightness of the chains 613, 614. A shaft 615 is secured between the pair of sprockets 611 for coupling the chains 613, 614 together and for allowing the chains 613, 614 to be moved in concert with each other. A guide 62 includes two couplers 621, 622 secured to the bottom and secured to the chains 613, 614 (FIGS. 3, 6, 7) for allowing the guide 62 to be moved in concert with the chains 613, 614. The coupler 622 includes a downward dependent ear 623 (FIG. 3) for slidably engaging with the rear edge of the board 51.

Figure 5:
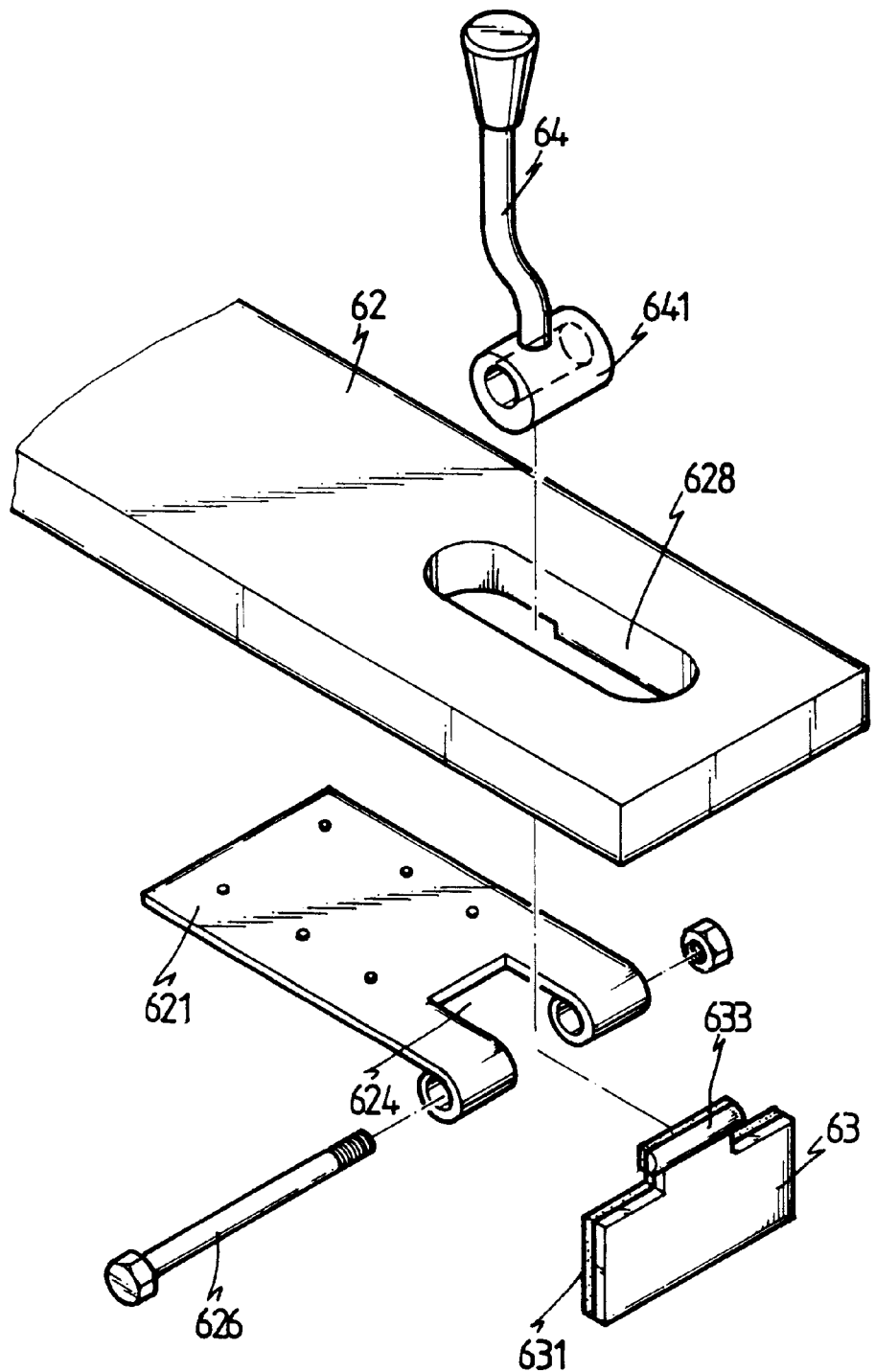
FIG. 5 is an exploded view of a lock device.
Figure 6:
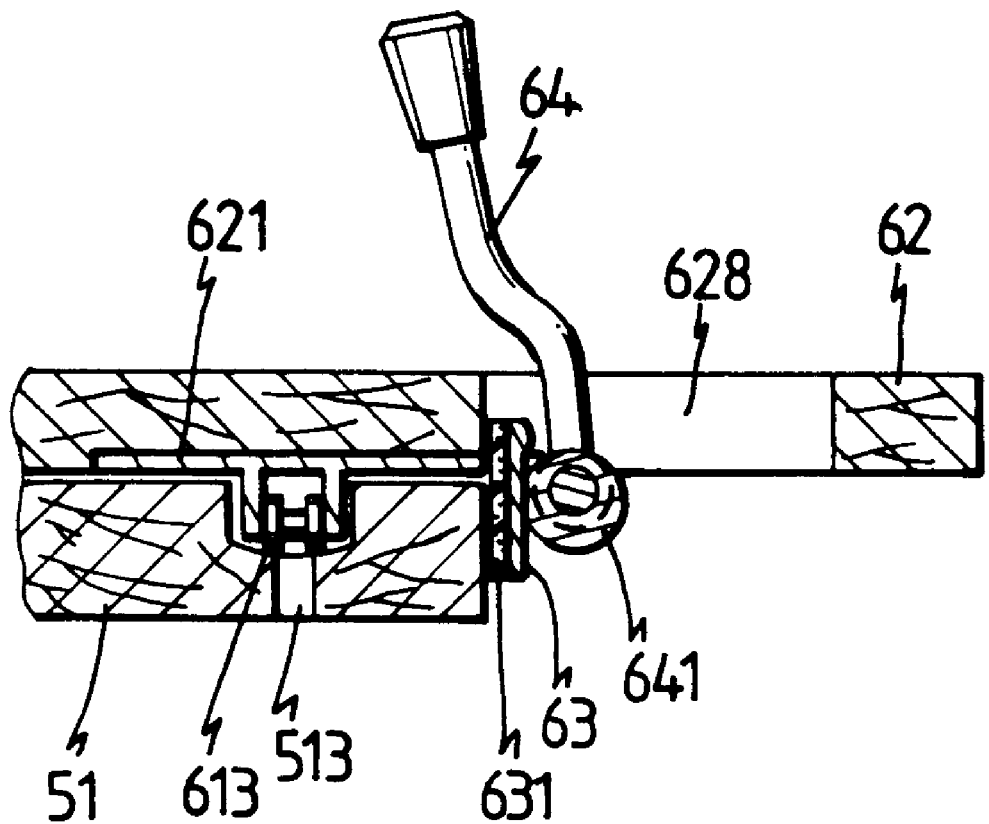
FIGS. 6 and 7 are partial cross sectional views illustrating the operation of the lock device.
Figure 7:
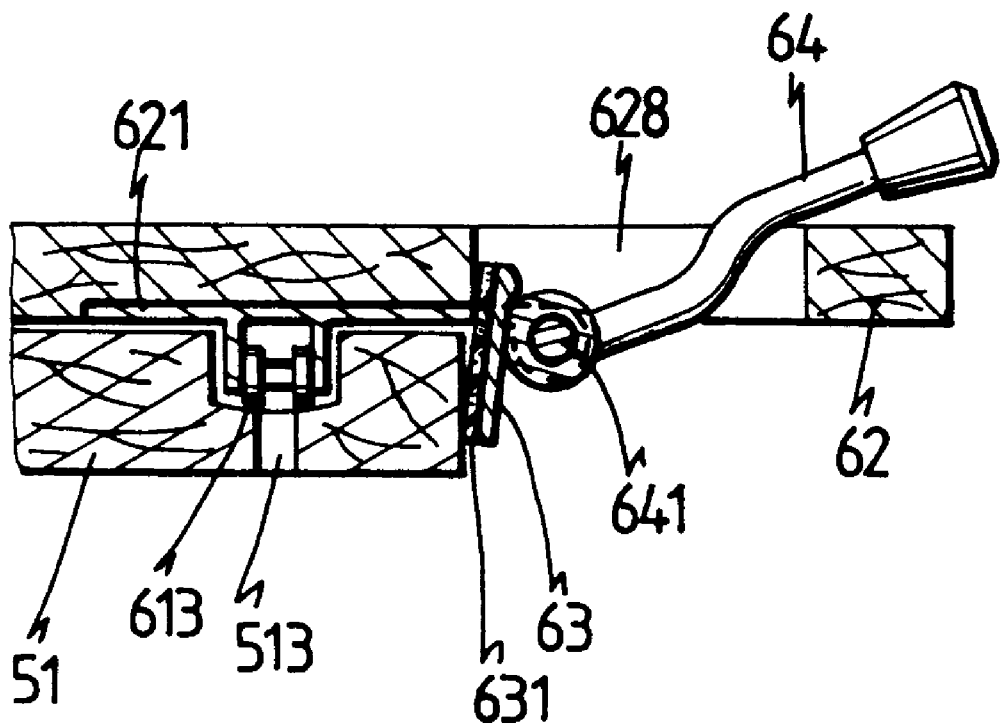

Referring next to FIGS. 5–7, and again to FIGS. 1–3, a handle 64 is extended through an oblong hole 628 of the guide 62 and secured to a cam 641 which is rotatably secured to the coupler 621 at an axle 626. A panel 63 includes a neck 633 slidably engaged in the notch 624 of the coupler 621 and includes a pad 631 for engaging with the front edge of the board 51. As best shown in FIGS. 6, 7, the cam 641 may be rotated about the axle 626 by the handle 64 in order to force the panel 63 to engage with the board 51 and in order to secure and to lock the guide 62 in place to the board 51. The guide 62 say thus be easily and quickly moved to the required position and then may be locked in place by the quick release mechanism formed by the couplers 621, 622 and the panel 63 and the cam 641.

Figure 8:
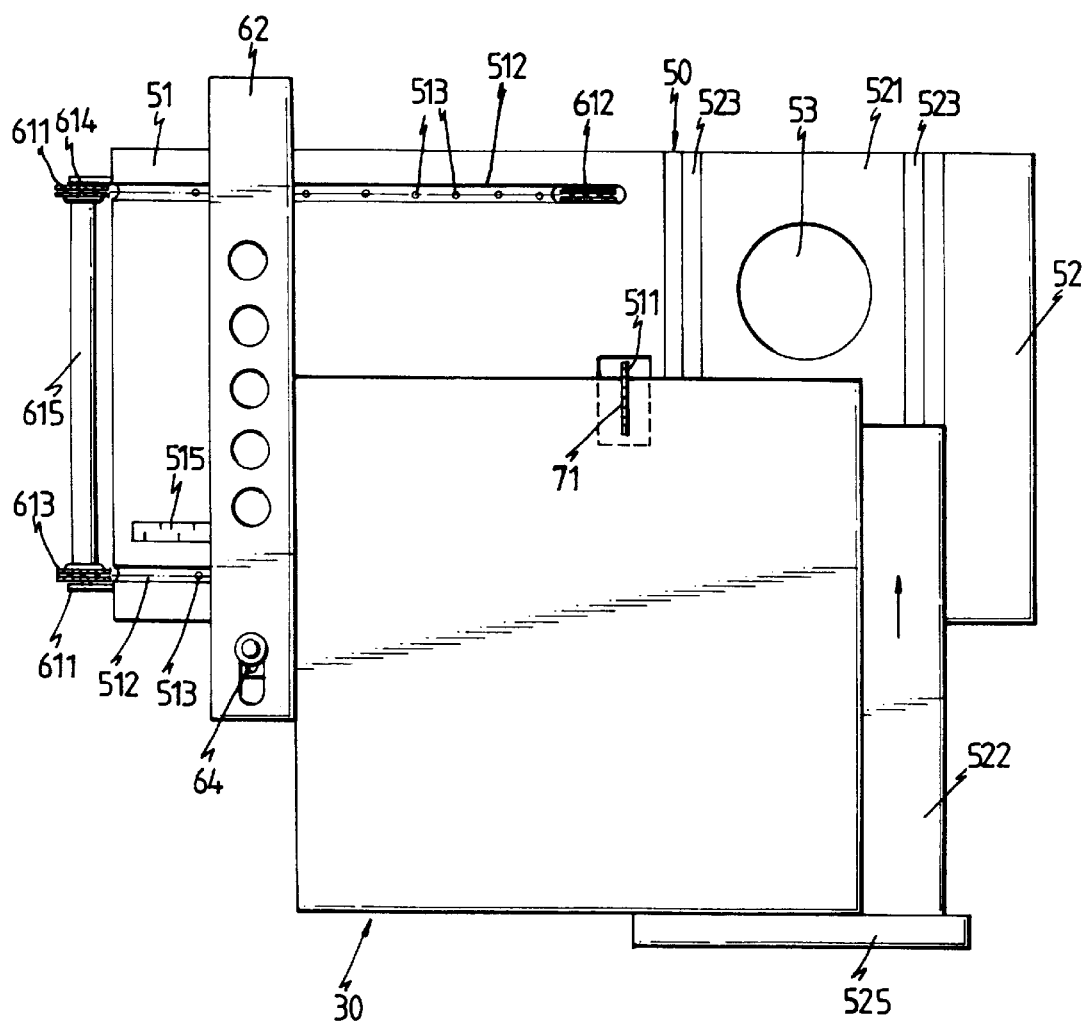
FIG. 8 is a top view of the work bench.
Figure 9:
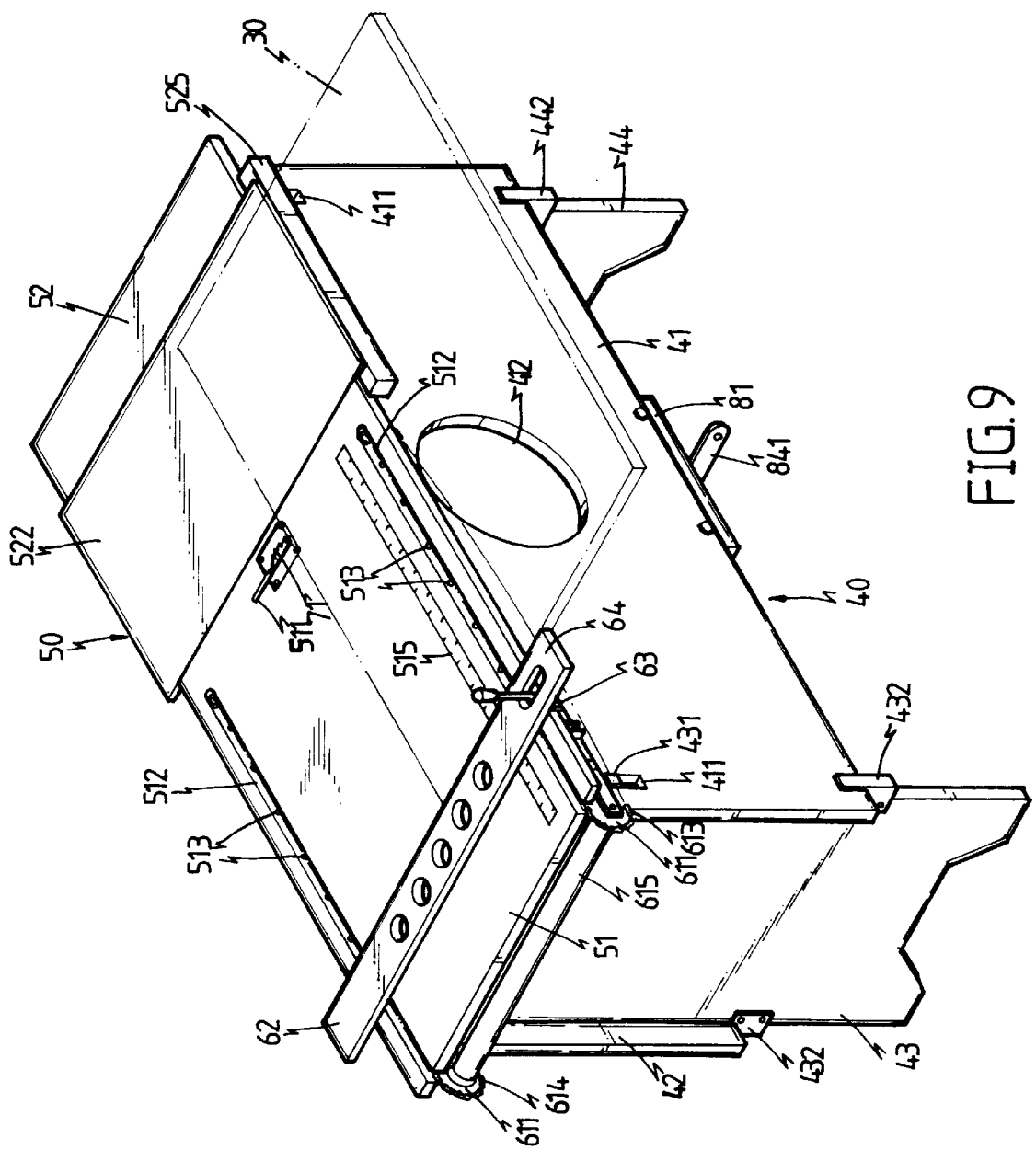
FIGS. 9 and 10 are perspective views illustrating the operation of the work bench.
Figure 10:
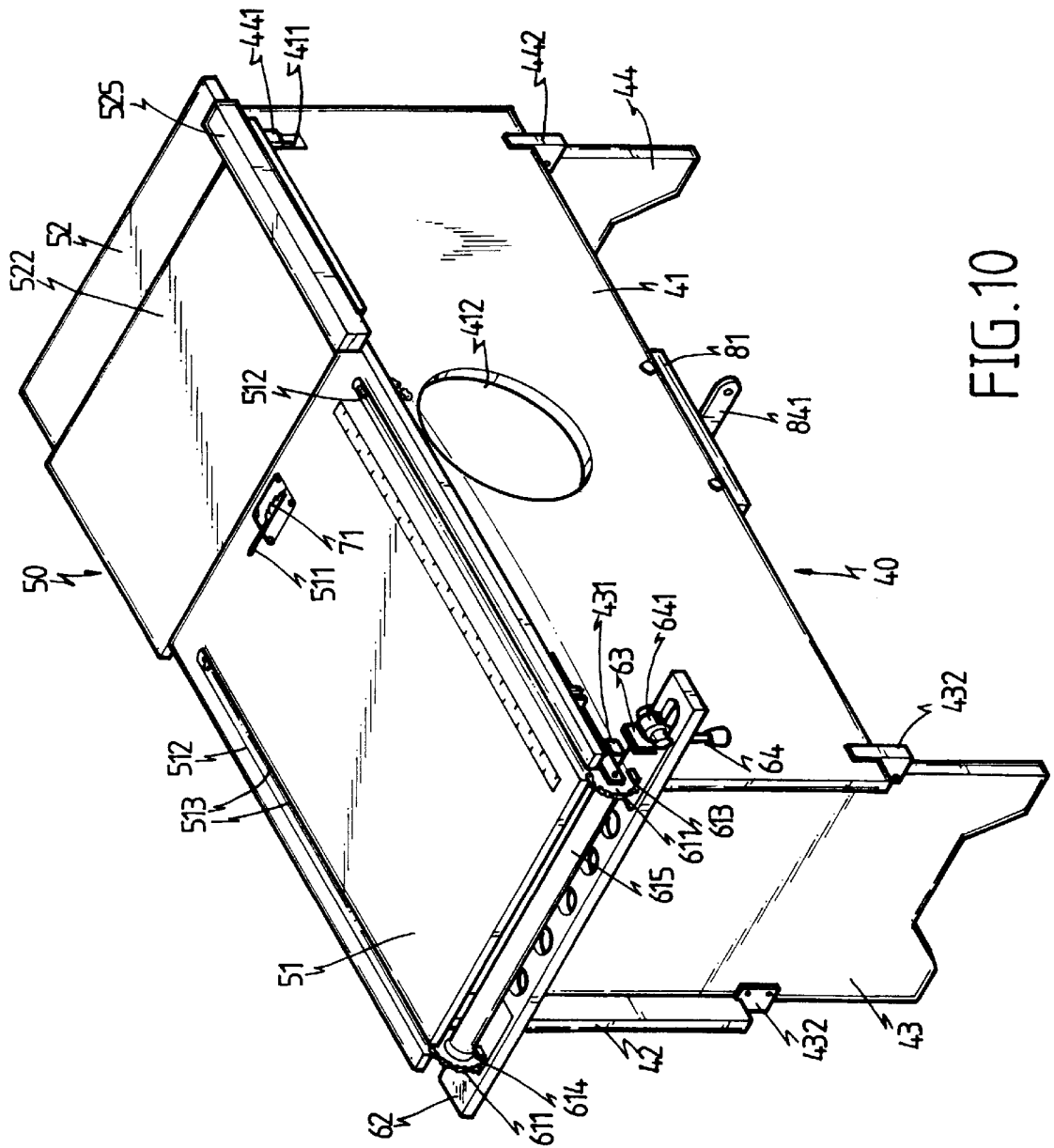

In operation, as shown in FIG. 8, the work piece 30 to be machined is engaged on the slide 522 and engaged with the beam 525 and the guide 62 and may be moved along the guide 62 by the slide 522. The guide 62 may be adjusted relative to the slide 522 by the quick release mechanism 621, 622, 63, 64 and by the chains 613, 614 when the guide 62 is released. As shown in FIG. 9, the slide 522 may also be disposed up side down for extending the beam 525 downward and for allowing the work piece 30 to be slided relative to the slide 522. As shown in FIG. 10, the guide 62 may also be moved to the bottom of the table 50 when the guide 62 is not required to be used.

Figure 11:
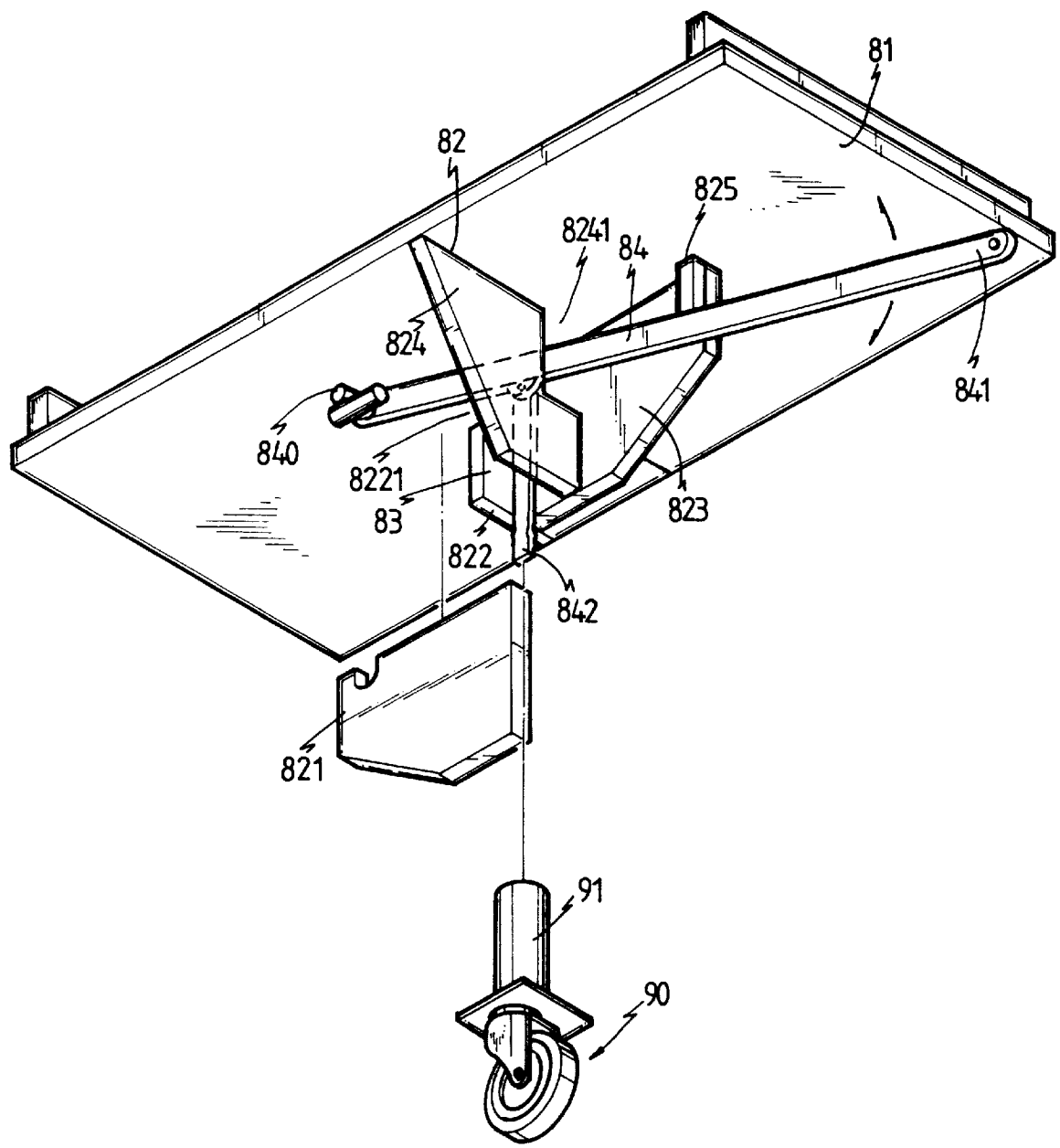
FIG. 11 is a partial exploded view of a moving device.
Figure 12:
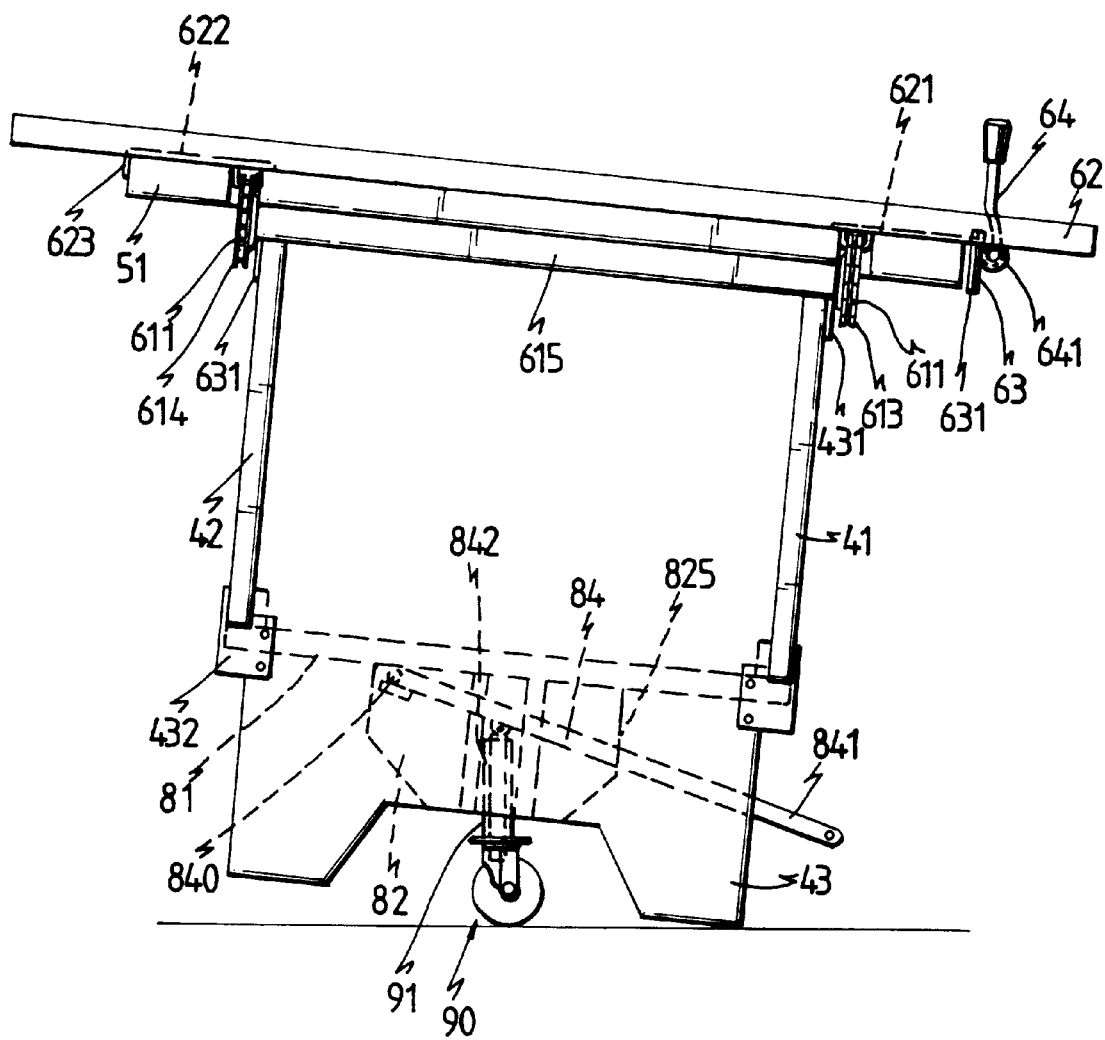
FIG. 12 is a schematic view illustrating the operation of the moving device.

Referring next to FIGS. 11, 12 and again to FIG. 3, a bottom plate 81 is secured to the bottom of the front plate 41 and the rear plate 42 and is spaced from the supporting surface or the ground for a distance. Four boards 821, 822, 823, 824 are secured to the bottom of the bottom plate 81 for forming a chamber 83. The boards 821–824 includes a passage 8221, 8241 formed therein and communicating with the chamber 83. A lever 84 is extended through the passage 8221, 8241 and has one end pivotally coupled to the bottom plate 81 at a pin 840 and includes the other end 841 slightly extended forward of the front plate 41 for forming a hand grip and for being actuated by the user. A pole 842 is slidably engaged in the chamber 83 and has an upper end secured to the lever 84 so as to be actuated by the lever 84. A wheel 90 has a barrel 91 secured to the pole 842 such that the wheel 90 may be moved downward beyond the bottom of the base 40 by the lever 841 (FIG. 12) and such that the work bench may be easily moved. The board 823 has a stop 825 (FIG. 11) for engaging with the lever 841 and for maintaining the lever 841 at the downward working position (FIG. 12) and for allowing the work bench to be easily moved. The sawdust may move downward and outward of the grooves 512 via the holes 513.

Accordingly, the work bench includes a guide which may be easily adjusted relative to the table to different positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A work bench comprising:

a base, a table secured on top of said base, said table including a pair of parallel grooves formed therein, two pairs of sprockets rotatably secured to said table and extended inward of said pair of grooves, two endless chains engaged with said sprockets and each including a portion slidably engaged in said pair of grooves, a guide secured to said chains and moveable in concert with said chains, and means for locking said guide to said table.

2. The work bench according to claim 1, wherein said table includes a bottom and includes a pair of ribs secured to said bottom of said table and parallel to each other, said sprockets are rotatably secured to said ribs and extended inward of said grooves.

3. The work bench according to claim 1 further comprising a shaft secured between a first pair of said sprockets for allowing said chains to be moved in concert with each other.

4. The work bench according to claim 1, wherein said guide locking means includes two couplers secured between said guide and said chains for allowing said guide to be moved in concert with said chains.

5. The work bench according to claim 4, wherein a first of said couplers includes a downward dependent ear for slidably engaging with said table, and a quick release device secured to a second of said couplers for engaging with said table and for locking said guide to said table.

6. The work bench according to claim 5, wherein said quick release device includes a cam rotatably secured to said second coupler, said second coupler includes a notch and a panel having a neck portion slidably engaged in said notch, said cam is engaged with said panel for forcing said panel to engage with said table and to lock said guide to said table.

7. The work bench according to claim 6, wherein said guide includes an oblong hole, said cam includes a handle extended through said oblong hole for allowing said cam to be easily operated.

8. The work bench according to claim 1 further comprising means for moving said work bench.

9. The work bench according to claim 8, wherein said base includes a bottom plate, a lever having a first end pivotally coupled to said bottom plate at a pin and having a second end and having a middle portion, and a wheel secured to said middle portion of said lever, said wheel is allowed to be moved downward beyond said base when said lever is rotated about said pin.

10. The work bench according to claim 9, wherein said bottom plate has a stop for engaging with said lever and for maintaining said lever at a downward position.

* * * * *